United States Patent
Chen et al.

(10) Patent No.: US 10,989,808 B2
(45) Date of Patent: Apr. 27, 2021

(54) METHOD, DEVICE AND STORAGE MEDIUM FOR EXTRACTING HEIGHT AND DEFORMATION INFORMATION OF HIGH VOLTAGE TRANSMISSION TOWER BY USING SAR TOMOGRAPHY

(71) Applicant: University of Electronic Science and Technology of China, Chengdu (CN)

(72) Inventors: Yan Chen, Chengdu (CN); Yunping Chen, Chengdu (CN); Jing Chen, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 218 days.

(21) Appl. No.: 16/169,053

(22) Filed: Oct. 24, 2018

(65) Prior Publication Data

US 2019/0339381 A1 Nov. 7, 2019

(51) Int. Cl.
*G01S 13/90* (2006.01)
*G01S 7/282* (2006.01)

(52) U.S. Cl.
CPC ............ *G01S 13/904* (2019.05); *G01S 7/282* (2013.01)

(58) Field of Classification Search
CPC ............................... G01S 13/904; G01S 7/282
See application file for complete search history.

(56) References Cited

U.S. PATENT DOCUMENTS

| | | | | |
|---|---|---|---|---|
| 2015/0309160 A1* | 10/2015 | Giunta | ..................... | G01H 9/00 342/118 |
| 2016/0033639 A1* | 2/2016 | Jung | .................... | G01S 13/9023 342/25 C |
| 2017/0356733 A1* | 12/2017 | Karami Porzani | ......................... | G01S 13/9005 |
| 2018/0081051 A1* | 3/2018 | Michelini | ............... | G06T 7/246 |
| 2018/0098137 A1* | 4/2018 | Saha | ................ | G06Q 10/06316 |
| 2019/0353779 A1* | 11/2019 | Wan | ..................... | G01S 13/9029 |
| 2020/0003895 A1* | 1/2020 | Soli | ......................... | G01S 13/75 |

\* cited by examiner

*Primary Examiner* — Marcus E Windrich
(74) *Attorney, Agent, or Firm* — Billion & Armitage

(57) ABSTRACT

A method, a device and a storage medium for extracting height and deformation information of a high voltage transmission tower by using SAR tomography are disclosed. A Spaceborne satellite is used to obtain a plurality of high resolution SAR images of a region having a high voltage transmission tower. The images are then pre-processed via registration, dechirp and phase compensation to obtain observation data. The observation data is then discretized. Then the discretized observation data is resampled by using singular value decomposition, and Akaike information criterion is used to estimate the number of scattering points in the resampled observation data. The obtained number of the scattering points is used to eliminate the singular values in the reconstructed signal. Finally, the sparsity of the observation data is used together with compression sensing to realize signal reconstruction, thereby extracting the height and deformation rate at a position on the high voltage transmission tower.

8 Claims, 4 Drawing Sheets

METHOD, DEVICE AND STORAGE MEDIUM FOR EXTRACTING HEIGHT AND DEFORMATION INFORMATION OF HIGH VOLTAGE TRANSMISSION TOWER BY USING SAR TOMOGRAPHY

CROSS-REFERENCE TO RELATED APPLICATIONS

This application claims priority to and/or benefit from Chinese Application No. 201810414279.6, filed on May 3, 2018, entitled "METHOD FOR EXTRACTING HEIGHT AND DEFORMATION INFORMATION OF HIGH VOLTAGE TRANSMISSION TOWER BY USING SAR TOMOGRAPHY", the specification of which is incorporated by reference herein in its entirety.

TECHNICAL FIELD

The present disclosure relates to the field of Synthetic Aperture Radar (SAR) imaging technologies, more particularly, to a method, a device and a storage medium for extracting height and deformation information of a high voltage transmission Lower by using SAR tomography.

BACKGROUND

High voltage transmission towers are important parts of power transmission lines, with operation states of which determining the stable and safe operation of a power system. The detection of height and deformation information of a high voltage transmission tower is a key factor for guaranteeing the safety of the transmission lines. In this sense, research on the height and deformation information of the high voltage transmission towers is both critical and necessary.

Conventional SAR techniques can monitor an object around the clock under all weather conditions, without being influenced by fog, rain or snow. However, pixels in a SAR image generated thereby are actually addition of scattering coefficients of all scattering points with a same distance, which will cause issues of cylindrical symmetrical ambiguity and layover-relief displacement, thus making it difficult to identify and extract the object. Moreover, the conventional SAR uses phase unwrapping to obtain high precision information. The complexity of the unwrapping procedure also makes the information extraction more difficult.

The development of SAR tomography helps to solve the above problem. Currently, algorithms for SAR tomography imaging make use of Fourier transform, RELAX algorithm and Multiple Signal Classification (MUSIC) based on matrix eigen decomposition.

SUMMARY

Embodiments of the present disclosure provide a method, a device and a storage medium for extracting height and deformation information of a high voltage transmission tower by using SAR tomography.

According to a first aspect of the present disclosure, a method for extracting height and deformation information of a high voltage transmission tower by using SAR tomography is provided. The method comprises:

a step of obtaining a series of SAR images and data parameters of the SAR images, wherein a spaceborne satellite is used to observe a high voltage transmission tower at different time and from different route locations, so as to obtain the series of SAR images and the data parameters of the SAR images;

a step of image pre-processing, wherein one of the obtained series of SAR images is taken as a primary image and the others are registered with the primary image, such that same pixels in the series of images correspond to same ground objects, and same pixels corresponding to a position on the high voltage transmission tower of the registered series of images are selected, then observation data corresponding to the pixels is dechirped and phase compensated to obtain observation data of the pixels which is to be used for SAR tomographic reconstruction;

a discretization step, wherein the obtained observation data is discretized to obtain an observation data set;

a resampling step, wherein a resampling method based on singular value decomposition is used to resample the discretized observation data, obtaining a new resampled observation data set;

a step of estimating a number of scattering points, wherein Akaike information criterion is used to estimate the number of scattering points in the resampled observation data set, so as to obtain the number of scattering points in the pixel; and a step of reconstructing a complex scattering function and extracting information on height and deformation rate, wherein a minimum L1 norm algorithm based on compressed sensing is used to process the resampled observation data set, by using the number of the scattering points, to reconstruct the complex scattering function, and the information on the height and deformation rate of the high voltage transmission tower corresponding to the pixel is extracted.

According to a second aspect of the disclosure, a device for extracting height and deformation information of a high voltage transmission tower by using SAR tomography is provided. The device comprises: a processor and a storage medium for storing instructions executable by the processor. The processor is configured to perform: a step of obtaining a series of SAR images and data parameters of the SAR images, wherein a spaceborne satellite is used to observe a high voltage transmission tower at different time and from different route locations, so as to obtain the series of SAR images and the data parameters of the SAR images; a step of image pre-processing, wherein one of the obtained series of SAR images is taken as a primary image and the others are registered with the primary image, such that same pixels in the series of images correspond to same ground objects, and same pixels corresponding to a position on the high voltage transmission tower of the registered series of images are selected, then observation data corresponding to the pixels is dechirped and phase compensated to obtain observation data of the pixels which is to be used for SAR tomographic reconstruction; a discretization step, wherein the obtained observation data is discretized to obtain an observation data set; a resampling step, wherein a resampling method based on singular value decomposition is used to resample the discretized observation data, obtaining a new resampled observation data set; a step of estimating a number of scattering points, wherein Akaike information criterion is used to estimate the number of scattering points in the resampled observation data set, so as to obtain the number of scattering points in the pixel; a step of reconstructing a complex scattering function and extracting information on the height and deformation rate, wherein a minimum L1 norm algorithm based on compressed sensing is used to process the resampled observation data set, by using the number of the scattering points, to reconstruct the complex scattering function, and the information on the height and deformation rate of the high voltage transmission tower corresponding to the pixel is extracted.

According to a third aspect of the disclosure, a non-volatile computer readable storage medium having instructions stored thereon is provided. A device is made to execute the method of extracting height and deformation information of a high voltage transmission tower by using SAR tomography as provided by the first aspect of the invention, when the instructions are executed by a processor of the device.

It can be understood that the above general description and the following detailed description are for illustrative and explanatory purpose only and are not limitative of the disclosure.

BRIEF DESCRIPTION OF THE DRAWINGS

Drawings here are incorporated into and form part of the description, which are used to illustrate embodiments and the principle of the disclosure together with the description.

DETAILED DESCRIPTION

Hereinafter, specific embodiments of the present disclosure will be described with reference to accompanying drawings, so as to make a person skilled in the art better understand the present disclosure. In the following description, detailed descriptions of known functions and designs will be ignored here if the detailed descriptions may blur the main contents of the present disclosure.

Figure 1:
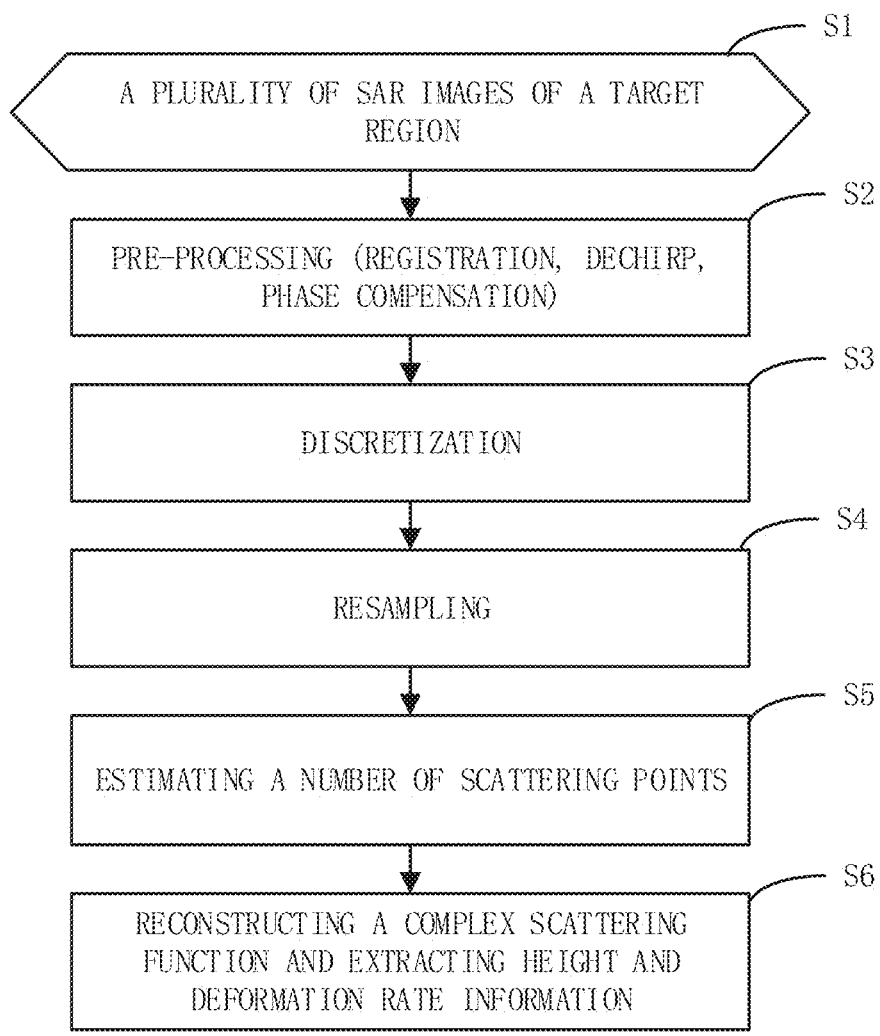
FIG. 1 schematically illustrates a flow chart of a method for extracting height and deformation information of a high voltage transmission tower of the present disclosure.

In the present disclosure, FIG. 1 is a flow chart of an embodiment of a method for extracting height and deformation information of a high voltage transmission tower by using SAR tomography. As illustrated in FIG. 1, the method for extracting height and deformation information of a high voltage transmission tower by using SAR tomography comprises the following steps.

S1, Obtaining a series of SAR images and data parameters of the SAR images. As an example, a spaceborne satellite is used to observe a same region having a high voltage transmission tower at different time and from different route locations, so as to obtain the series of SAR images and the data parameters of the SAR image. In the embodiment, an original SAR image may be a spaceborne TerraSAR-X high resolution SAR image.

The commercial software SARscape may be used to obtain the SAR image data parameters, such as the wavelength $\lambda$, the incident angle $\theta$, the center slant range r, the number of SAR images N, the vertical baselines $b_n$ and the temporal baselines $t_n$ and so on.

S2, Image pre-processing: one of the obtained series of SAR images is taken as a primary image and the other images are registered with the primary image, such that the same pixels in the series of images correspond to same ground objects, and same pixels corresponding to a position on the high voltage transmission tower of the registered series of images are selected, then observation data corresponding to the pixels is dechirped and phase compensated to obtain observation data of the pixels which is to be used for SAR tomographic reconstruction.

As an example, the images may be pre-processed by using the following equation to obtain the observation data:

$$g_n = \int_{-S_{max}}^{S_{max}} \int_{-V_{max}}^{V_{max}} \gamma(s,v) \exp\left(j\frac{4\pi b_n}{\lambda r}s\right) \exp\left(-j\frac{4\pi t_n}{\lambda}v\right) ds\, dv$$

where $g_n$ is observation data of the nth SAR image, $\gamma(s,v)$ is a complex scattering function of scattering points in the pixel along a height direction and a deformation rate direction, $[-S_{max}, S_{max}]$ and $[-V_{max}, V_{max}]$ are respectively imaging ranges along the height direction and the deformation rate direction, $\lambda$ is the wavelength, r is the center slant range, $b_n$ is the vertical base line and $t_n$ is the temporal baseline.

S3, Discretization: the obtained observation data is discretized to obtain an observation data set.

As an example, assuming there are P sample points along the height direction s, and L sample points along the deformation rate direction v, and the total sample points are U=P×L, $g_n$ is then discretized as:

$$g_n = \sum_{p=1}^{P} \sum_{l=1}^{L} \gamma(s_p, v_l) \exp\left(j\frac{4\pi b_n}{\lambda r}s_p\right) \exp\left(-j\frac{4\pi t_n}{\lambda}v_l\right) + e_n$$

where $e_n$ is additive noises, n=1, 2, K N, and it may be written as a matrix as:

$g = R\gamma + e$ where g is an N×1 matrix, $g=[g_1\ g_2\ \ldots\ g_N]^T$ is the observation data set; R is an N×U matrix named observation matrix; $R = R_y \otimes R_v$, $\otimes$ is Kronecker product.

$$R_s = [\exp(j2\pi\xi_n s_1) \exp(j2\pi\xi_n s_2) \ldots \exp(j2\pi\xi_n s_P)]^T$$

$$R_v = [\exp(j2\pi\eta_n v_1) \exp(j2\pi\eta_n v_2) \ldots \exp(j2\pi\eta_n v_L)]^T$$

$$\xi_n = \frac{2b_n}{\lambda r},\ \eta_n = -\frac{2t_n}{\lambda};$$

$$\gamma = [\gamma(s_1, v_1) \ldots \gamma(s_1, v_L) \ldots \gamma(s_P, v_L) \ldots \gamma(s_P, v_L)]^T$$

is a U×1 complex scattering function to be reconstructed;

$e = [e_1 e_2 \ldots e_N]^T$ is U×1 noise.

S4, Resampling: a resampling method based on singular value decomposition is used to resample the discretized observation data, obtaining a new resampled observation data set.

Figure 2:
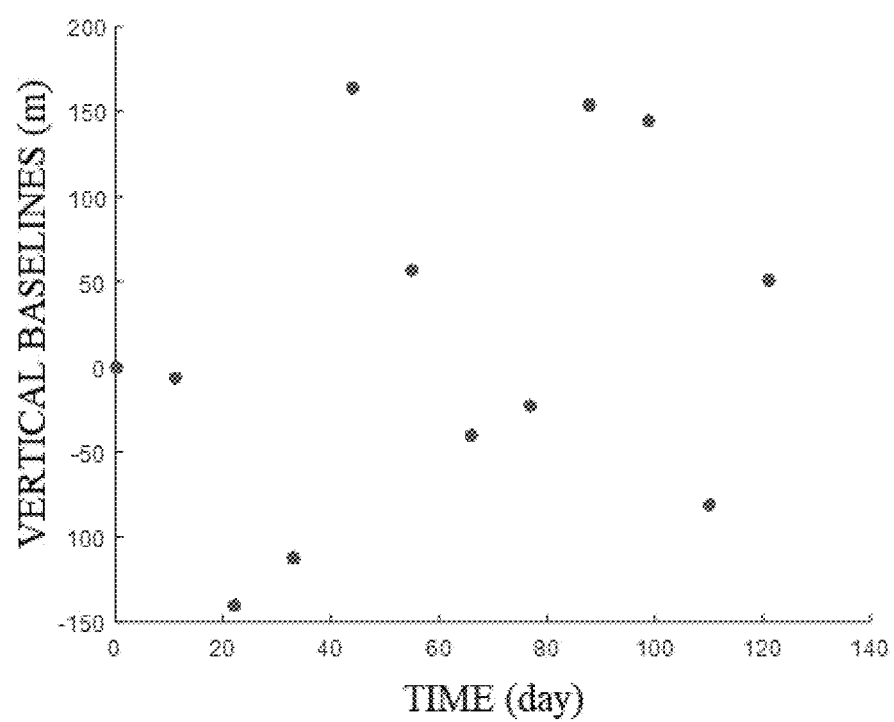
FIG. 2 schematically illustrates a distribution of vertical baselines of the present disclosure.

In the present disclosure, a vertical baseline distribution of the obtained observation data is shown in FIG. 2. The vertical baselines are distributed sparsely and evenly. Therefore, the resampling method based on singular value decomposition is used to reduce reconstruction errors caused by non-even baselines.

A real vertical baseline distribution is $b_n$, and a virtual vertical baseline distribution is $b_m^0$, n, m=1, 2, K N, $\lambda$ is the wavelength, r is the center slant range. Assuming that spatial frequencies are $$f_n = \frac{2b_n}{\lambda_r}, f_m^0 = \frac{2b_m^0}{\lambda r},$$

interpolation is used to resample the observation data $$h_m = \sum_{n=1}^{N} g_n \sin c[2S_{max}(f_m^0 - f_n)],$$

where $\sin c(x)=\sin(\pi x)/(\pi x)$, $G_{m,n}=\sin c[2S_{max}(f_m^0-f_n)]$, then the resampled observation data set may be represented as h=Gg, where $$G = \begin{bmatrix} G_{1,1} & G_{1,2} & L & G_{1,N} \\ G_{2,1} & G_{2,2} & L & G_{2,N} \\ M & M & M & M \\ G_{N,1} & G_{N,2} & L & G_{N,N} \end{bmatrix},$$

$g=[g_1 \; g_2 \; L \; g_N]^T$ and $h=[h_1 \; h_2 \; L \; h_N]^T$ are resampled observation data set.

The matrix G is singular value decomposed:

$$G = U\sum V^T = \sum_{i=1}^{N} u_i \sigma_i v_i^T,$$

U and V are N-dimensional unitary matrices, $U=[u_1 \; u_2 \; K \; u_N]$, $V=[v_1 \; v_2 \; K \; v_N]$, $\Sigma$ is an N×N diagonal matrix:

$$\sum = \begin{bmatrix} \sigma_1 & & & 0 & L & 0 \\ & \sigma_2 & & 0 & L & 0 \\ & & O & 0 & L & 0 \\ & & & \sigma_N & 0 & L & 0 \end{bmatrix}$$

where $\sigma_1 \geq \sigma_2 \geq \ldots \geq \sigma_N$ are singular values of G. Let $\Sigma_0(1:N,1:N)=\text{diag}(\sigma_n^{-1})$, and the matrix $G=U\Sigma_0 V^T$ is updated, to obtain a new observation data set h=Gg.

S5, Estimating a number of scattering points, Akaike information criterion is used to estimate the number of scattering points in the resampled observation data set, so as to obtain the number of scattering points in the pixel.

Figure 3:
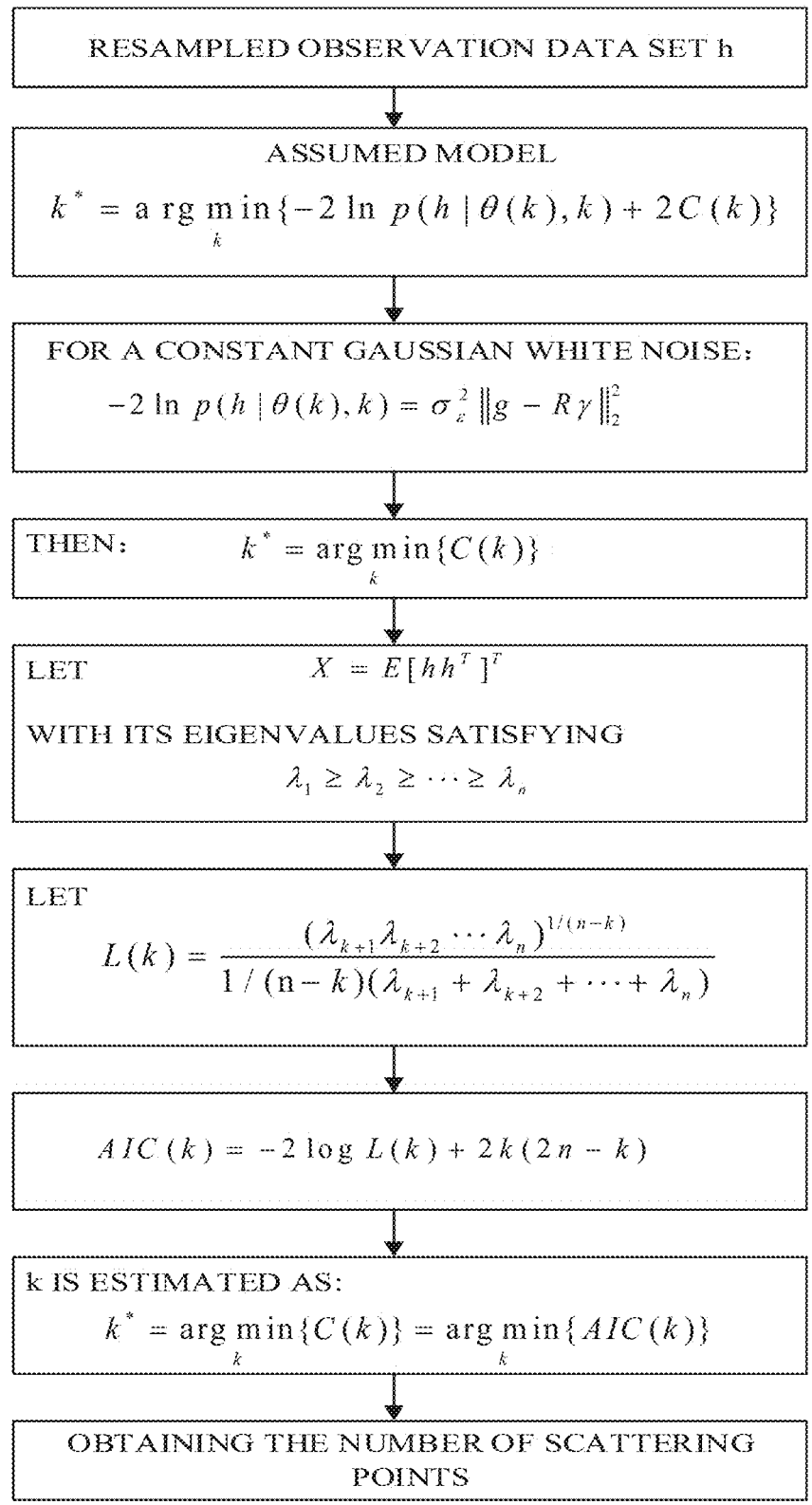
FIG. 3 schematically illustrates a flow chart of estimating a number of scattering points of the present disclosure.

The purpose of estimating the number of scattering points is to estimate, as accurately as possible, the number of scattering point in a pixel. With reference to FIG. 3, a general formula of an estimation model is as follows:

$$k^* = \arg\min_k \{-2\ln p(h|\theta(k),k) + 2C(k)\}$$

where $p(h|\theta(k),k)$ is used to evaluate the fitting degree between the model and the observation value, and C(k) is a penalty. In real imaging process, the noise is usually a constant Gaussian white noise, therefore there is a covariance matrix $C_{\epsilon\epsilon}=-\sigma_\epsilon^2 I$, $\sigma_\epsilon^2$ represents variance of the noise, I is a unitary matrix, then $-2\ln p(h|\theta(k), k)=\sigma_\epsilon^2\|g-R\gamma\|_2^2$ is of a constant value, where h is the resampled observation data set, R is the observation matrix, and γ is a complex scattering function to be reconstructed.

In the embodiment, the penalty C(k) follows Akaike information criterion (AIC), $X=E[hh^T]^T$ is the autocorrelation matrix of the observation data set, with its eigenvalues satisfying $\lambda_1 \geq \lambda_2 \geq \ldots \lambda_n$, it follows that:

$$L(k) = \frac{(\lambda_{k+1}\lambda_{k+2} \ldots \lambda_n)^{1/(n-k)}}{1/(n-k)(\lambda_{k+1} + \lambda_{k+2} + \ldots + \lambda_n)}$$

$$AIC(k) = -2\log L(k) + 2k(2n-k)$$

L(k) is a logarithmic likelihood function. As $-2\ln p(h|\theta(k),k)$ has a constant value, $$k^* = \arg\min_k \{C(k)\} = \arg\min_k (AIC(k)),$$

where k* is the estimated number of scattering points, in real imaging process $k^* \in [0,2]$.

S6, Reconstructing a complex scattering function and extracting information on height and deformation rate: a minimum L1 norm algorithm based on compressed sensing is used to process the resampled observation data set, by using the number of the scattering points, to reconstruct the complex scattering function γ, and the information on the height and deformation rate at the position on the high voltage transmission tower corresponding to the pixels is extracted.

It is learnt from the compressed sensing principle that if a signal to be reconstructed is sparse or compressible, then observation data with a sapling rate lower than Nyquist sampling rate may be used to reconstruct the signal. It is known from $k^* \in [0,2]$ that the complex scattering function γ to be reconstructed has only several scattering points, which meets the requirement of sparsity. Therefore, compressed sensing may be used to reconstruct the height information and the deformation rate information.

γ is reconstructed using minimum L norm, which can also prevent overfitting. L1 norm normalization is performed as follows:

$$\gamma = \arg\min_\gamma \{\|h - R\gamma\|_2^2 + u\|\gamma\|_1\}$$

where u is a normalization coefficient.

As the reconstructed γ includes singular values, therefore the number of scattering points obtained as step S5 is used to remove the singular value therein. Then least square is performed to obtain the final result:

$$\gamma = (R^H R)^{-1} R^H h$$

where h is the resampled observation data set. R is an observation matrix, γ is the complex scattering function to be reconstructed, $R^H$ is a transport matrix of the observation matrix, and γ includes the height information and deformation rate information at the position on the high voltage transmission tower which corresponds to the reconstructed points.

Exemplary Result

Twelve two dimensional images generated in 2016 are used, which has a baseline distribution as shown in FIG. 2. A SAR image from April 2016 is taken as the primary image, and other images are registered with the primary image. An selected area of the high voltage transmission tower is cropped, then same pixels on the ground in the series of images are selected as a reference point, and same pixels on the high voltage transmission tower are selected as a test point, which are pre-processed via de-chirp and phase compensation. Then information on the height and deformation rate at the position on the high voltage transmission tower is reconstructed according to the above steps S3 to S6.

It is assumed that the height and deformation rate of the reference point are zero, results for the test point will be corrected based thereon.

Figure 4:
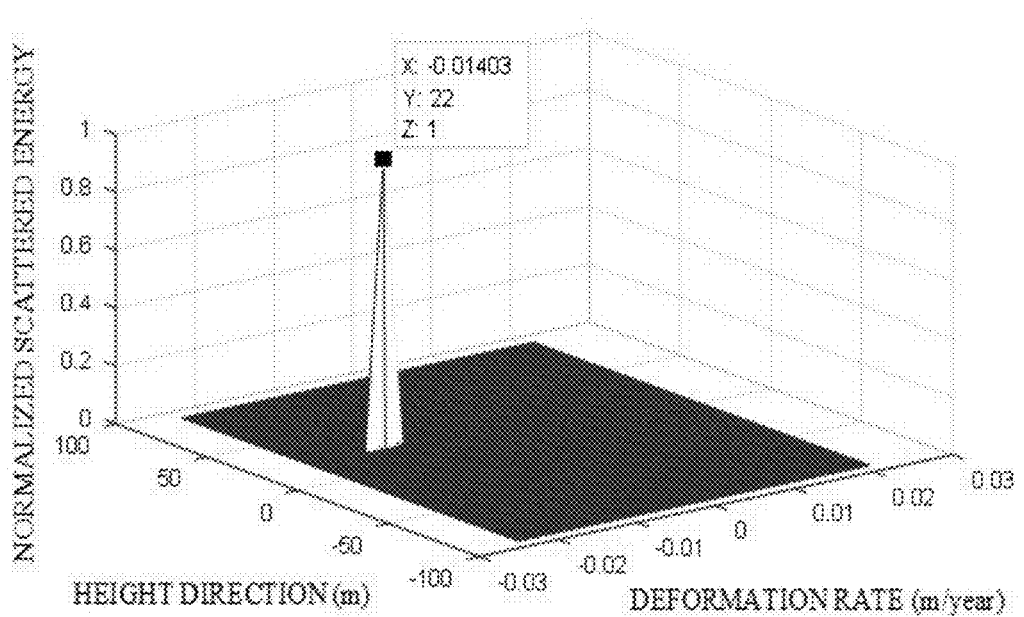
FIG. 4 is SAR tomographic result of a high voltage transmission tower of the present disclosure.

Results for the test point of the high voltage transmission tower are shown in FIG. 4. In the figure, x-axis is the deformation rate, "+" indicates that the deformation rate is further away from the satellite, and "−" indicates that the deformation rate is closer to the satellite; y-axis represents the height, "+" indicates that the height is higher than the reference points, and "−" indicates that the height is lower than the reference points. Thus the information on the height and deformation rate at the test point on the high voltage transmission tower is precisely extracted.

In summary, by using the SAR tomographic technology, the present disclosure constructs equivalent apertures along the height direction and the deformation rate direction for a number of SAR images obtained at different time and from different mute locations, using again the aperture synthesis theory. The resample, scattering point estimation and compression sensing are used to extract the height and deformation rate information at the object. The present disclosure thus solves the problem of large reconstruction errors caused by spare and unevenly distributed baselines.

Another embodiment of the present disclosure discloses a device for extracting height and deformation information of a high voltage transmission tower by using SAR tomography. The device comprises: a processor and a storage medium for storing instructions executable by the processor. The processor is configured to perform: a step of obtaining a series of SAR images and data parameters of the SAR images, wherein a spaceborne satellite is used to observe a high voltage transmission tower at different time and from different route locations, so as to obtain the series of SAR images and the data parameters of the SAR images; a step of image pre-processing, wherein one of the obtained series of SAR images is taken as a primary image and the others are registered with the primary image, such that same pixels in the series of images correspond to same ground objects, and same pixels corresponding to a position on the high voltage transmission tower of the registered series of images are selected, then observation data corresponding to the pixels is dechirped and phase compensated to obtain observation data of the pixels which is to be used for SAR tomographic reconstruction; a discretization step, wherein the obtained observation data is discretized to obtain an observation data set; a resampling step, wherein a resampling method based on singular value decomposition is used to resample the discretized observation data, obtaining a new resampled observation data set: a step of estimating a number of scattering points, wherein Akaike information criterion is used to estimate the number of scattering points in the resampled observation data set, so as to obtain the number of scattering points in the pixel; a step of reconstructing a complex scattering function and extracting information on the height and deformation rate, wherein a minimum L1 norm algorithm based on compressed sensing is used to process the resampled observation data set, by using the number of the scattering points, to reconstruct the complex scattering function, and the information on the height and deformation rate of the high voltage transmission tower corresponding to the pixel is extracted.

Another embodiment of the present disclosure provides a non-volatile computer readable storage medium having instructions stored thereon. A device is made to execute the method of extracting height and deformation of a high voltage transmission tower by using SAR tomography as provided above, when the instructions are executed by a processor of the device.

The method and device for extracting the height and deformation of the high voltage transmission tower as provided by the present disclosure first register a plurality of SAR images, then observation data corresponding to same pixels in the registered images are selected and then pre-processed using dechirp and phase compensation to obtain observation data which can be topographically processed. The obtained observation data is discretized to obtain an observation data set. The observation data set is then resampled based on singular decomposition, to obtain a new observation data set. Then the resampled observation data set is processed using Akaike information criterion, to estimate the number of scattering points in the pixels. Finally the minimum L1 norm algorithm based on compressed sensing is used to process the observation data set, by using the number of the scattering points, to reconstruct the complex scattering function, and the information on the height and deformation rate of the high voltage transmission tower corresponding to the pixel is extracted. The present disclosure uses resampling based on singular value decomposition to reduce the reconstruction errors caused by spare and unevenly distributed baselines. Moreover, by using the estimation of the number of scattering points and the sparsity of the observation data, the reconstruction of the complex scattering function is realized by using the compression sensing algorithm, which eliminates the singular values in the complex scattering function, thereby increasing the measurement precision. It thus realizes the extraction of the height and deformation information of the transmission towers in mountains with much interference.

Although the illustrative specific embodiments of the present disclosure have been described above to make a person skilled in the art readily understand the present disclosure, it should be clear that the present disclosure is not limited to the scope of the specific embodiments. For a person skilled in the art, various changes without departing from the scope and spirit of the present disclosure as defined and determined by the appended claims are apparent, and all public creations using the conception of the present disclosure fall within the protecting scope of the present disclosure.

What is claimed is:

1. A device for extracting height and deformation information of a high voltage transmission tower by using SAR tomography, comprising:
   a processor; and
   a storage means for storing processor executable instructions,
   wherein, the processor is configured to perform:
   a step of obtaining a series of SAR images and data parameters of the SAR images, wherein a spaceborne satellite is used to observe a high voltage transmission tower at different time and from different route locations, so as to obtain the series of SAR images and the data parameters of the SAR images;
   an image pre-processing step, wherein one of the obtained series of SAR images is taken as a primary image and the others are registered with the primary image, such that same pixels in the series of images correspond to same ground objects, and same pixels corresponding to a position on the high voltage transmission tower of the registered series of images are selected, then observation data corresponding to the pixels is dechirped and phase compensated to obtain observation data of the pixels which is to be used for SAR tomographic reconstruction;

a discretization step, wherein the obtained observation data is discretized to obtain an observation data set;

a resampling step, wherein a resampling method based on singular value decomposition is used to resample the discretized observation data, obtaining a new resampled observation data set;

a step of estimating a number of scattering points, wherein Akaike information criterion is used to estimate the number of scattering points in the resampled observation data set, so as to obtain the number of scattering points in the pixels; and a step of reconstructing a complex scattering function and extracting height and deformation rate information, wherein a minimum L1 norm algorithm based on compressed sensing is used to process the resampled observation data set, by using the number of the scattering points, to reconstruct the complex scattering function, and the height and deformation rate information at the position of the high voltage transmission tower corresponding to the pixels are extracted.

2. The device of claim 1, wherein the data parameters of the SAR images comprise a wavelength $\lambda$, an incident angle $\theta$, a center slant range r, a number of SAR images n, vertical baselines $b_n$ and temporal baselines $t_n$.

3. The device of claim 2, wherein the observation data obtained at the image pre-processing step is:

$$g_n = \int_{-S_{max}}^{S_{max}} \int_{-V_{max}}^{V_{max}} \gamma(s,v) \exp\left(j\frac{4\pi b_n}{\lambda r}s\right)\exp\left(-j\frac{4\pi t_n}{\lambda}v\right)dsdv$$

where $g_n$ is observation data of the nth SAR image, $\gamma(s,v)$ is a complex scattering function of scattering points in the pixels along a height direction and a deformation rate direction, $[-S_{max},S_{max}]$ and $[-V_{max},V_{max}]$ are respectively imaging ranges along the height direction s and the deformation rate direction v, $\lambda$ is the wavelength, r is the center slant range, $b_n$ is the vertical baselines and $t_n$ is the temporal baselines.

4. The device of claim 3, wherein the discretization step comprises:

assuming there are P sample points along the height direction s, and L sample points along the deformation rate direction v, the total sample points are U=P×L, $g_n$ is then discretized as:

$$g_n = \sum_{p=1}^{P}\sum_{l=1}^{L} \gamma(s_p,v_l)\exp\left(j\frac{4\pi b_n}{\lambda r}s_p\right)\exp\left(-j\frac{4\pi t_n}{\lambda}v_l\right) + e_n$$

where $e_n$ is additive noises, n=1, 2,K N, writing $g_n$ into a matrix as:

$g=R\gamma+e$ where g is an N×1 matrix, $g=[g_1\ g_2\ \ldots\ g_N]^T$ is the observation data set; R is an N×U matrix named observation matrix; $R=R_s \otimes R_v$, $\otimes$ is Kronecker product, $R_s = [\exp(j2\pi\xi_n s_1)\exp(j2\pi\xi_n s_2)\ \ldots\ \exp(j2\pi\xi_n s_P)]^T$ $R_v = [\exp(j2\pi\eta_n v_1)\exp(j2\pi\eta_n v_2)\ \ldots\ \exp(j2\pi\eta_n v_L)]^T$ $\xi_n = \frac{2b_n}{\lambda r}, \eta_n = -\frac{2t_n}{\lambda};$ $\gamma = [\gamma(s_1,v_1)\ \ldots\ \gamma(s_1,v_L)\ \ldots\ \gamma(s_P,v_1)\ \ldots\ \gamma(s_P,v_L)]^T$ is an U×1 dimensional complex scattering function to be reconstructed;

$e=[e_1\ e_2\ \ldots\ e_N]^T$ is U×1 dimensional noise.

5. A non-volatile computer readable storage medium having instructions stored thereon, wherein a device is made to execute a method of extracting height and deformation information of a high voltage transmission tower by using SAR tomography, when the instructions are executed by a processor of the device, the method comprises:

a step of obtaining a series of SAR images and data parameters of the SAR images, wherein a spaceborne satellite is used to observe a high voltage transmission tower at different time and from different route locations, so as to obtain the series of SAR images and the data parameters of the SAR images;

an image pre-processing step, wherein one of the obtained series of SAR images is taken as a primary image and the others are registered with the primary image, such that same pixels in the series of images correspond to same ground objects, and same pixels corresponding to a position on the high voltage transmission tower of the registered series of images are selected, then observation data corresponding to the pixels is dechirped and phase compensated to obtain observation data of the pixels which is to be used for SAR tomographic reconstruction;

a discretization step, wherein the obtained observation data is discretized to obtain an observation data set;

a resampling step, wherein a resampling method based on singular value decomposition is used to resample the discretized observation data, obtaining a new resampled observation data set;

a step of estimating a number of scattering points, wherein Akaike information criterion is used to estimate the number of scattering points in the resampled observation data set, so as to obtain the number of scattering points in the pixels; and a step of reconstructing a complex scattering function and extracting height and deformation rate information, wherein a minimum L1 norm algorithm based on compressed sensing is used to process the resampled observation data set, by using the number of the scattering points, to reconstruct the complex scattering function, and the height and deformation rate information at the position of the high voltage transmission tower corresponding to the pixels are extracted.

6. The storage medium of claim 5, wherein the data parameters of the SAR images comprise a wavelength $\Delta$, an incident angle $\theta$, a center slant range r, a number of SAR images n, vertical baselines $b_n$ and temporal baselines $t_n$.

7. The storage medium of claim 6, wherein the observation data obtained at the image pre-processing step is:

$$g_n = \int_{-S_{max}}^{S_{max}} \int_{-V_{max}}^{V_{max}} \gamma(s,v) \exp\left(j\frac{4\pi b_n}{\lambda r}s\right)\exp\left(-j\frac{4\pi t_n}{\lambda}v\right)dsdv$$

where $g_n$ is observation data of the nth SAR image, $\gamma(s,v)$ is a complex scattering function of scattering points in the pixels along a height direction and a deformation rate direction, $[-S_{max}, S_{max}]$ and $[-V_{max}, V_{max}]$ are respectively imaging ranges along the height direction s and the deformation rate direction v, $\lambda$ is the wavelength, r is the center slant range, $b_n$ is the vertical baselines and $t_n$ is the temporal baselines.

8. The storage medium of claim 7, wherein the discretization step comprises:

assuming there are P sample points along the height direction s, and L sample points along the deformation rate direction v, the total sample points are $U=P\times L$, $g_n$ is then discretized as:

$$g_n = \sum_{p=1}^{P}\sum_{l=1}^{L} \gamma(s_p, v_l) \exp\left(j\frac{4\pi b_n}{\lambda r}s_p\right)\exp\left(-j\frac{4\pi t_n}{\lambda}v_l\right) + e_n$$

where $e_n$ is additive noises, n=1, 2,K N, writing $g_n$ into a matrix as:

$$g = R\gamma + e$$

where g is an N×1 matrix, $g=[g_1\ g_2\ \ldots\ g_N]^T$ is the observation data set; R is an N×U matrix named observation matrix; $R=R_s \otimes R_v$, $\otimes$ is Kronecker product, $$R_s = [\exp(j2\pi\xi_n s_1)\exp(j2\pi\xi_n s_2)\ \ldots\ \exp(j2\pi\xi_n s_P)]^T$$
$$R_v = [\exp(j2\pi\eta_n v_1)\exp(j2\pi\eta_n v_2)\ \ldots\ \exp(j2\pi\eta_n v_L)]^T$$
$$\xi_n = \frac{2b_n}{\lambda r},\ \eta_n = -\frac{2t_n}{\lambda};$$

$\gamma=[\gamma(s_1,v_1)\ldots\gamma(s_1,v_L)\ldots\gamma(s_P,v_1)\ldots\gamma(s_P,v_L)]^T$ is an U×1 dimensional complex scattering function to be reconstructed;

$e=[e_1\ e_2\ \ldots\ e_N]^T$ is U×1 dimensional noise.

* * * * *